(12) United States Patent
Leetham

(10) Patent No.: US 9,075,991 B1
(45) Date of Patent: Jul. 7, 2015

(54) LOOTING DETECTION AND REMEDIATION

(75) Inventor: Todd Leetham, Bedford, MA (US)

(73) Assignee: EMC Corporation, Hopkinton, MA (US)

( * ) Notice: Subject to any disclaimer, the term of this patent is extended or adjusted under 35 U.S.C. 154(b) by 834 days.

(21) Appl. No.: 13/155,648

(22) Filed: Jun. 8, 2011

(51) Int. Cl.
G06F 21/00 (2013.01)
G06F 21/55 (2013.01)
G06F 21/56 (2013.01)

(52) U.S. Cl.
CPC .............. *G06F 21/554* (2013.01); *G06F 21/56* (2013.01); *G06F 21/566* (2013.01); *G06F 21/552* (2013.01)

(58) Field of Classification Search
CPC ....... G06F 21/56; G06F 21/566; G06F 21/50; G06F 21/554; G06F 21/552; G06F 21/556; H04L 63/1441; H04L 63/1416
USPC ................................................ 726/11, 22–24
See application file for complete search history.

(56) References Cited

U.S. PATENT DOCUMENTS

| | | | | |
|---|---|---|---|---|
| 6,321,338 | B1 * | 11/2001 | Porras et al. | 726/25 |
| 7,530,106 | B1 * | 5/2009 | Zaitsev et al. | 726/24 |
| 7,610,624 | B1 * | 10/2009 | Brothers et al. | 726/24 |
| 2003/0212906 | A1 * | 11/2003 | Arnold et al. | 713/201 |
| 2006/0026683 | A1 * | 2/2006 | Lim | 726/23 |
| 2006/0179040 | A1 * | 8/2006 | Bird et al. | 707/3 |
| 2006/0236401 | A1 * | 10/2006 | Fosdick | 726/25 |
| 2006/0293777 | A1 * | 12/2006 | Breitgand et al. | 700/108 |
| 2007/0028297 | A1 * | 2/2007 | Troyansky et al. | 726/2 |
| 2008/0077943 | A1 * | 3/2008 | Pierce et al. | 719/329 |
| 2010/0251369 | A1 * | 9/2010 | Grant | 726/23 |
| 2010/0306850 | A1 * | 12/2010 | Barile et al. | 726/25 |
| 2011/0145920 | A1 * | 6/2011 | Mahaffey et al. | 726/22 |

OTHER PUBLICATIONS

Shabtai et al., ""Andromaly": a behavioral malware detection framework for android devices", Aug. 2010, pp. 235-249 http://nslab.kaist.ac.kr/courses/2011/cs710/paperlist/2-29.pdf.*
Symantec, "Symantec Security Response: Pwdump" Jul. 2007, pp. 1-3 http://www.symantec.com/security_response/print_writeup.jsp?docid=2005-032616-0025-99.*
Webroot, "Hacktool.Pwdump", Jul. 2006, pp. 1-3 http://www.webrootsecuritystore.com/spyware-virus/Hacktool.Pwdump.php.*
Winkler, Ira. "Zen and the Art of Information Security." United States: Syngress Publishing, Inc., 2007, pp. 35-36.
Shostack, et al, "The New School of Information Security", Upper Saddle River, NJ: Addison-Wesley, 2008. pp. 68-70.

* cited by examiner

*Primary Examiner* — Kaveh Abrishamkar
*Assistant Examiner* — Carlos M De Jesus Lassaia
(74) *Attorney, Agent, or Firm* — BainwoodHuang

(57) ABSTRACT

Security of sensitive information stored on a computing system is protected by monitoring a set of performance indicators of the computing system and executing remedial measures to protect the sensitive information when the set of performance indicators indicates a likelihood of malicious activity. A particular technique involves limiting the amount of sensitive information looted during a malicious attack on a computing system. The technique includes monitoring a set of performance indicators of the computing system. The set of performance indicators provides a measure of sensitive information being accessed on the computing system. The technique further includes testing whether the monitored set of performance indicators indicates a likelihood of looting, and temporarily reducing access to the sensitive information on the computing system in response to the act of testing indicating a likelihood of looting.

17 Claims, 5 Drawing Sheets

LOOTING DETECTION AND REMEDIATION

BACKGROUND

Conventional computing systems typically include antivirus software, which prevents code having malicious filenames or malicious character/code strings from executing. Periodically, the antivirus software receives updates containing newly discovered malicious filenames or malicious character/code strings.

Conventional network firewalls provide boundaries between different network portions. Some firewall devices are equipped with intrusion detection features to detect attacks by monitoring network traffic. If such a device detects an incoming network transmission which appears to be non-malicious, the device permits that network transmission to pass through without marking it as malicious. However, if the device detects an incoming network transmission which appears to be malicious, the device blocks that network transmission from passing through.

Conventional computing systems also typically employ credentials (e.g., user names, passwords, tokens, and certificates) to restrict access to sensitive information. Users with valid credentials are allowed access to the sensitive information, whereas users without valid credentials are denied access to the sensitive information.

SUMMARY

Unfortunately, there are deficiencies with the above-described conventional antivirus software, network firewall devices with intrusion detection features, and use of credentials. For example, a computer system running conventional antivirus software is vulnerable to code with new malicious filenames and character/code strings until the antivirus software receives relevant updates. Additionally, the above-described conventional firewall device with intrusion detection features may not consider certain network transmissions as malicious even though such transmissions are part of an attack. Also, valid credentials can sometimes fall into malicious hands, allowing malicious users to gain access to a computing system.

Improved data security may be obtained by applying the observation that security breaches are often correlated with changes in performance indicators of computing systems. "Performance indicators" are measures of computerized activity generated by operating systems, applications, disk accesses, network traffic, database accesses, sensors, and/or other electronic operations. It is observed that malicious access to sensitive data, or "looting," is often associated with a distinctive and rapid change in one or more performance indicators. By monitoring the performance indicators of a computing system (e.g., a computerized device and the surrounding environment), a security technique can detect looting while it is taking place and take measures to remediate its effects. These measures may include stopping the looting in progress. As a consequence, instead of the entire contents of a data store being looted, only a small fraction of its total contents may be obtained.

One embodiment is directed to a method of limiting the amount of sensitive information looted during a malicious attack on a computing system. The method includes monitoring a set of performance indicators of the computing system. The set of performance indicators provides a measure of sensitive information being accessed on the computing system. The method further includes testing whether the monitored set of performance indicators indicates a likelihood of looting, and temporarily reducing access to the sensitive information on the computing system in response to the act of testing indicating a likelihood of looting.

Other embodiments are directed to computerized apparatus and devices, computerize components and circuitry, and computer program products. Furthermore, some embodiments involve activity which is performed at a single location, while other embodiments involve activity which is distributed over a computerized environment (e.g., over a network).

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention. In the accompanying drawings.

DETAILED DESCRIPTION

Companies, governments, organizations, and individuals have grown ever more reliant on computers to store sensitive information. Sensitive information may take many forms, including personal data, such as names, user names, passwords, email addresses, financial account numbers, social security numbers, medical histories, and other information. It may include corporate information, such as trade secrets, confidential information, and private employee data. Sensitive information may also include government secrets, such as classified information. Indeed, any data stored on a computer or computer network may qualify as "sensitive information" if the owner of the information or any other party desires for it to be protected.

An improved data security technique disclosed herein operates to limit the amount of sensitive information maliciously accessed, or "looted," from a computing system by monitoring a set of performance indicators of the computing system, determining whether the set of performance indicators suggests a likelihood of looting, and executing remedial measures to limit the amount of data maliciously obtained if looting is suspected. Accordingly, even if an attacker has already gained access to the computing system, the technique is able to minimize the amount of actual looting or perhaps even prevent actual looting altogether.

Techniques for limiting the effects of looting may be employed in connection with a computing system connected to a computer network, such as a Local Area Network (LAN), a Wide Area Network (WAN), the Internet, or any combination thereof.

Figure 1:
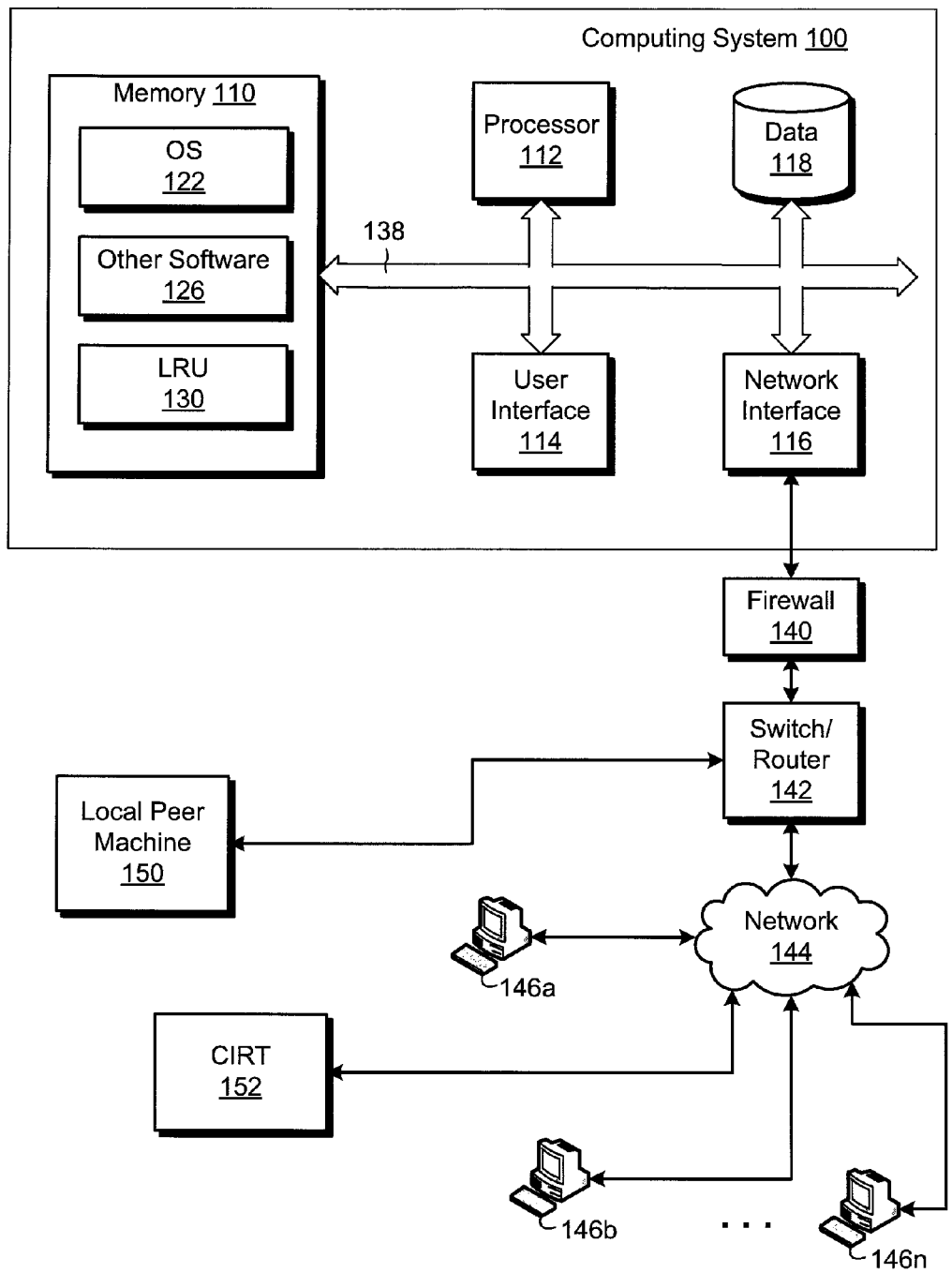
FIG. 1 is a block diagram of an example of a network and computing system in which looting detection and remediation may be employed.

FIG. 1 shows an example of a computing system 100 and network. The computing system 100 includes memory 110, a processor 112, a user interface 114 (e.g., keyboard, pointer, and display), a network interface 116, a data store 118, and a bus 138. The data store 118 may be used for storing sensitive information.

The memory 110 of the computing system 100 is typically loaded with an operating system 122, such as Microsoft Windows, Unix, OSX, Red Hat Linux, or the like. As shown, the memory 110 is also loaded with other software 126 (e.g., applications, programs, processes, services, daemons, and the like), and a Looting Remediation Unit, or "LRU" 130. The processor 112 preferably runs the LRU 130 whenever the computing system 100 is online. The LRU 130 monitors the computing system 100 for signs of looting and takes remedial action if looting is suspected.

In the example shown, the computing system 100 is connected to a firewall 140 and to a network switch or router 142. Alternatively, the switch/router 142 may include its own firewall, or a software firewall may be provided within the computing system 100. One or more local peer machines 150 may be connected to the switch/router for operating on the same LAN as the computing system 100.

Also as shown, the switch/router 142 is connected to a network 144, such as the Internet. The computing system 100 is thereby exposed to a large number of remote computing machines 146a-n. These computing machines may be of any network-connectable kind, such as desktop computers, laptop computers, tablets, smart phones, PDAs, television set top boxes, and the like. Users of the computing machines 146a-n may communicate with the computing system 100 over the Internet, and may gain access to sensitive information in the data store 118 if they have valid credentials or if they can circumvent the computing system's other defenses, such as the firewall 124, anti-virus software, and/or anti-malware software.

In the example shown, a Critical Incident Response Team, or "CIRT" 152 is connected to the network 144. Normally, the computing system 100 notifies the CIRT 152 in the event of suspected or actual malicious intrusion, to allow the CIRT 152 to respond to the threat. The CIRT 152 is typically one or more computers and individuals whose role it is to respond to malicious computer attacks.

In one type of operation, the computing system 100 is configured as a server, such as a web server and/or data server. Users can log on to the server via remote machines 146a-n with their valid user credentials and access their sensitive data over the network 144. Malicious users, such as those who have stolen valid credentials from authorized users or who obtain access through other means, can also access the computing system 100 in an attempt to loot the sensitive information stored in the data store 118.

Figure 2:
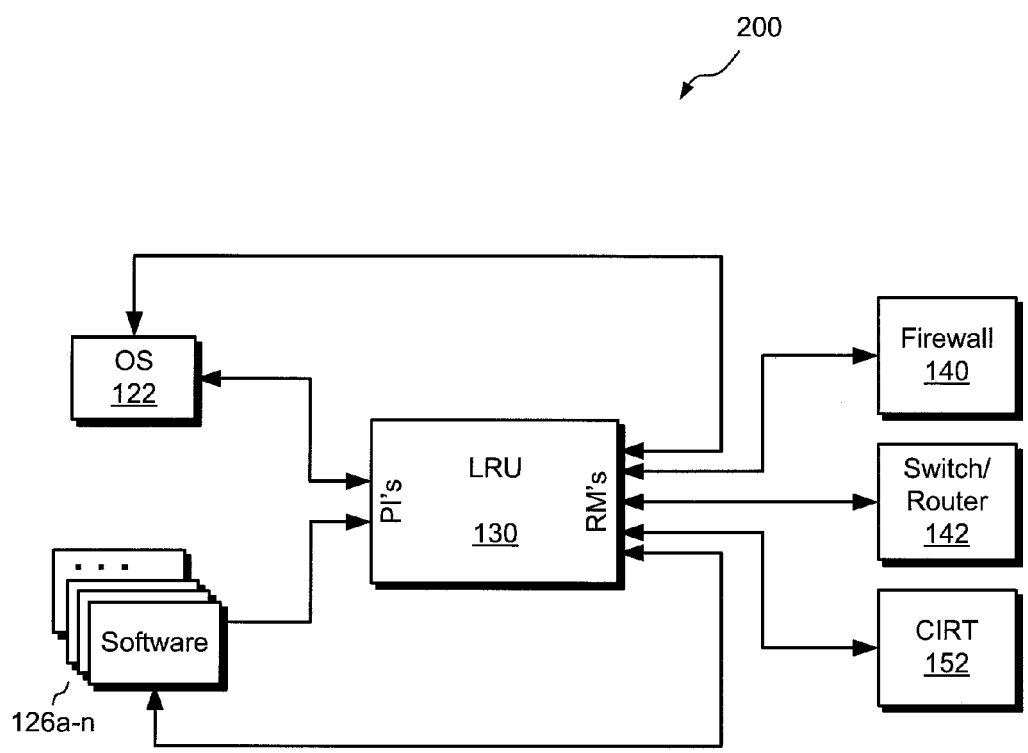
FIG. 2 is a more detailed block diagram of components of the network and computing system of FIG. 1 that are involved in looting detection and remediation.

FIG. 2 shows certain features of FIG. 1 in greater detail. Here, the LRU 130 is seen to be in communication with various items, such as the OS 122, software 126a-n, firewall 140, switch router 142, and CIRT 152. As shown, the LRU 130 receives inputs from a first set of items, such as the OS 122 and software 126a-n. This first set of items conveys a set of performance indicators, or "PI's," of the computing system 100 to the LRU 130. The LRU 130 is also seen to provide outputs to a second set of items. The second set of items includes the OS 122 and software 126a-n, as well as the firewall 140, upstream switch/router 142, and CIRT 152, for example. The outputs are in the form of directions to perform remedial measures, or "RM's," in response to the LRU 130 detecting a likelihood of looting. The remedial measures are preferably specific directions to particular items, e.g., to the firewall 140 to shut down a network segment or to the OS 122 to log out users and/or terminate processes. The first set of items and second set of items are not intended to be necessarily distinct. For example, the OS 122 and software 126a-n may be included in both the first set of items and the second set of items, meaning they may both provide performance indicators and receive directions to perform remedial measures. Also, it is understood that the first set of items and second set of items may include any type of software (e.g., executable programs, processes, daemons, services, and the like), and may also include hardware (such as the switch/router 142) that is provided with a software interface.

Performance indicators may include a wide range of indicators, such as the number of authentication requests per second made to an authentication server (e.g., the active directory of a domain controller). Performance indicators may also include the number of database queries per second to a database, or the number of reads per second (e.g., disk I/O) of a storage device. Indeed, the scope of performance indicators is intended to include any indicator of computing activity that is likely to change when looting occurs. Performance indicators are therefore preferably those indicators of a computing system that change in a way that is highly correlated with looting activity, so that looting can be inferred indirectly, by observing the performance indicator(s), with a reasonably high degree of certainty, even when looting as a matter of certain fact cannot immediately be confirmed.

Remedial measures may include a wide range of actions, such as slowing down or stopping computer software (e.g., processes, applications, daemons, and the like), shutting down databases, logging out users, blocking network traffic, and notifying the CIRT 152 of suspected looting. The scope of remedial measures is intended to include any remedial measures taken to limit the effects of looting or to otherwise respond to a threat. Remedial measures are therefore preferably selected to be those measures that protect the sensitive data in direct and effective ways. Remedial measures are preferably given high priority to reflect the fact that their execution may be essential for protecting the sensitive information.

Preferably, each of the second set of items is programmed to respond to its respective remedial measure direction(s) by taking appropriate action. In one example, the firewall 140, upon receiving a remedial measure direction, is programmed to respond by shutting down network traffic to the computing system 100. Similarly, the switch/router 142, upon receiving a remedial measure direction, is programmed to shut down an entire network segment. In an example, the OS 122 responds to a remedial measure direction by shutting down processes and/or logging out users.

A software interface of the LRU 130, such as an API, is preferably used to establish operative connections between the LRU 130 and the other elements shown in FIG. 2. The LRU 130 preferably receives performance indicators via the software interface from the first set of items, and outputs remedial measure directions via the software interface to the second set of items. The software interface preferably allows 2-way communication between the LRU 130 and each of the first and second set of items. In addition, items in the first and second set of items are preferably configured to respond to instructions from the LRU 130. In an example, the first set of items are configured to respond to instructions from the LRU 130 to report their performance indicators, and the second set of items are configured to perform designated remedial measures in response to the receipt of remedial measure directions.

The LRU 130 is configured to monitor the set of performance indicators, determine whether they indicate a likelihood of looting, and issue remedial measure directions if they do. Preferably, the LRU 130 is a software construct, such as a process or daemon, which runs continuously in the background. The LRU 130 preferably has an operating interface, which allows users (generally, administrators or others with enhanced privileges) to establish settings. Settings include, for example, the particular performance indicators to be monitored, the remedial measures to be invoked when likely looting is detected, and the criterion for determining whether looting is likely to be taking place. Settings may be refined over time or updated to reflect different types of threats.

Figure 3:
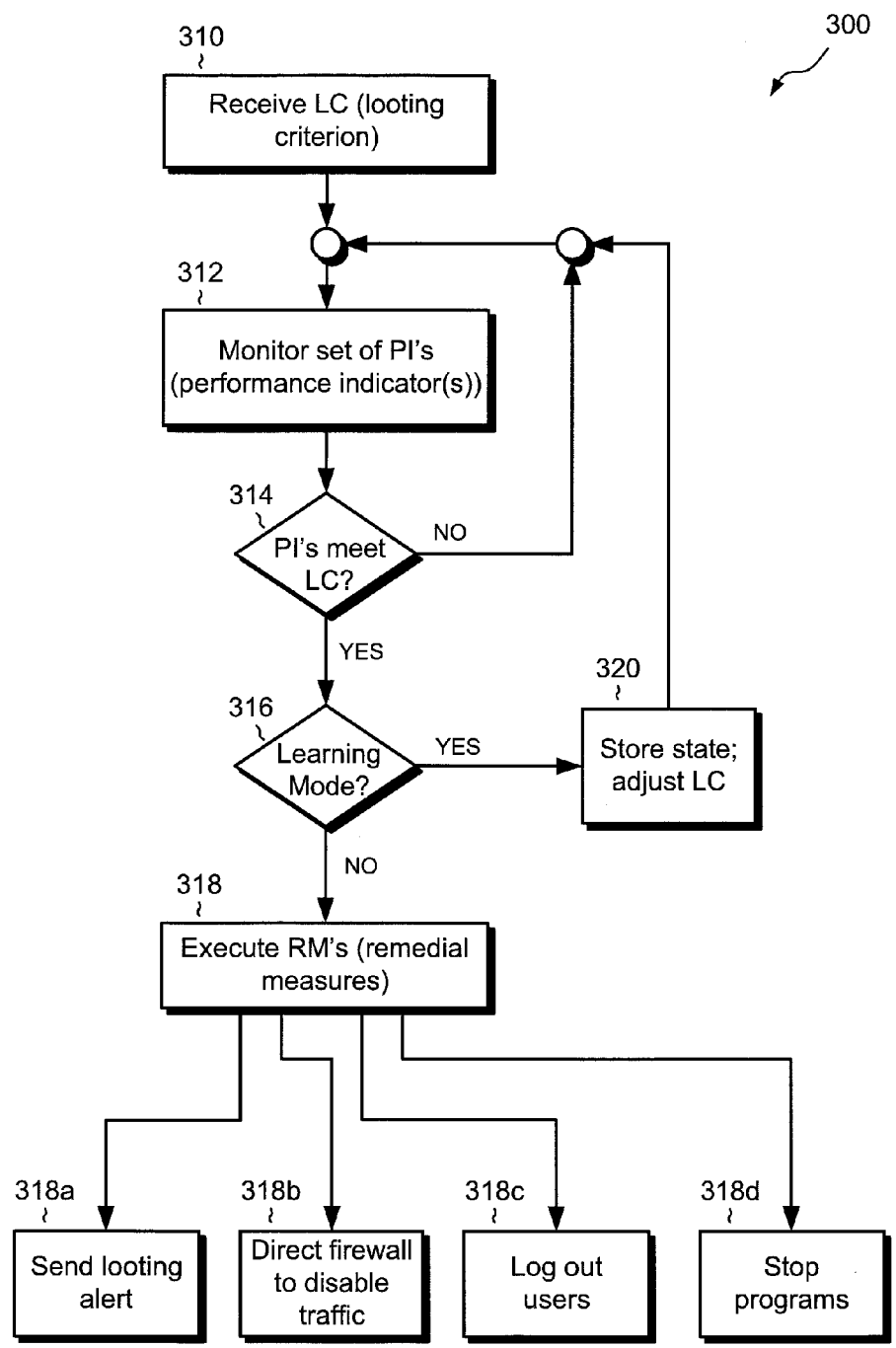
FIG. 3 is a flowchart showing an example of a process for detecting and remediating looting in a computing system.

FIG. 3 shows an example of a process for limiting the amount of sensitive information looted during a malicious attack on a computing system. In an example, this process may be conducted in the computing system 100 under direction of the LRU 130.

At step 310, a looting criterion is received. In one example, the looting criterion is supplied by an administrator or other user with enhanced privileges. This user accesses the LRU 130 and establishes appropriate settings via the LRU's user interface. In another example, the looting criterion is received from the LRU 130 itself. For instance, the looting criterion is generated through a process whereby the LRU 130 monitors various system performance indicators and applies an algorithm to generate the looting criterion automatically from the monitored behavior. The automatically generated looting criterion can be accepted directly or can be treated as a suggestion to be assessed and, if desirable, modified by an expert user before being put into effect. Accordingly, step 310 provides a variety of suitable sources, or source suggestions, from which the looting criterion can be received.

At step 312, a set of performance indicators is monitored. These performance indicators may originate from the OS 122, any of the software 126a-n, sensors provided with the computing system 100, or other sources. In one example, the set of performance indicators includes only a single performance indicator. In other examples, it includes multiple performance indicators.

In one example, the LRU 130, through the software interface, polls the OS 122 and software 126a-n for updated versions of the set of performance indicators on a regular basis, such as every second. In another example, the OS 122 and software 126-a-n use the software interface to report their performance indicators to the LRU 130 on a regular basis at their own direction. In yet another example, the OS 122 and software 126a-n are programmed to monitor their own performance indicators and inform the LRU 130 through the software interface only when the performance indicators show abnormal activity.

At step 314, a determination is made as to whether the set of performance indicators satisfies the looting criterion. If the looting criterion is met, control proceeds to step 316. Otherwise, control returns to step 312, where performance indicators continue to be monitored and then tested (step 314) against the looting criterion.

At step 316, a determination is made as to whether the method is being conducted in a learning mode. The LRU 130 may be configured in a learning mode in which it is trained to learn normal, baseline behavior of the set of performance indicators and to distinguish normal behavior from likely looting behavior. Learning mode may be used, for example, where the LRU 130 has recently been installed and has not yet established baseline behavior of the performance indicators. It may also be used when looting is being simulated, or in other instances. Simulated looting may be used for the purpose of collecting data on performance indicators' behavior or training the LRU 130 to distinguish between normal behavior and that which indicates a likelihood of looting. If learning mode is enabled, the LRU 130 is generally programmed to forego the execution of remedial measures when the looting criterion is met. Instead, the LRU 130 identifies a suitable looting criterion, or suggests such a criterion.

At step 320, learning mode is enabled and information concerning the state of the performance indicators is stored. The stored information can help to inform the system of proper settings of the looting criterion. Also at step 320, the looting criterion itself may be adjusted or tuned. Adjustment may be performed manually or automatically by the LRU 130 as it continues to learn to distinguish normal behavior of performance indicators from behavior that indicates a threat. Control may next return to step 312, where performance indicators continue to be monitored, data continues to be collected, and the system continues to learn.

However, if learning mode is not enabled, control proceeds to step 318. Here, the looting criterion has been met and there is therefore a likelihood that active looting is taking place. Remedial measures are executed. These generally include stopping the looting in progress and protecting the sensitive data from further loss. Specific examples of remedial measures include, for example, sending a looting alert to the CIRT 152 (step 318a), directing the firewall 140 to disable network traffic (step 318b), logging out users (step 318c), and/or stopping software (step 318d).

It is understood that the order of steps shown in FIG. 3 is merely an example. Unless clear dependencies prohibit otherwise, steps may be conducted in different orders or may be conducted simultaneously.

It is further understood that different remedial measures are to be used in different situations, depending on the nature of the threat. For example, if a database is being looted, it is usually sufficient to shut down the database and notify the CIRT 152. However, in other instances, users may be logged out, traffic may be blocked, and other actions may be taken. The remedial measures indicated in steps 318a-d are merely examples. Depending on the situation, some, all, or none of them may be executed. Remedial measures other than those indicated may be executed. The order in which remedial measures are executed is generally not critical, except that any looting notifications (such as to the CIRT 152) made over the Internet or other network should be made prior to any act of disabling traffic on that network.

Also, in an example, the process shown in FIG. 3 is adapted for covering different threats that can arise in a computing system simultaneously. For instance, the process of FIG. 3 can be run multiple times sequentially (once for each threat), in multiple instances simultaneously, or in a single instance in which multiple threats are managed simultaneously. For each threat scenario, a set of performance indicators appropriate to that scenario is collected, a looting criterion particular to that scenario is established, and remedial measures appropriate to that scenario are executed when the respective looting criterion is met.

Whether one or many scenarios are considered, each looting criterion may range from simple to complex. In one example, the set of performance indicators includes only a single performance indicator and the looting criterion is satisfied when the single performance indicator crosses a predetermined threshold. For instance, the performance indicator can designate a number of database queries per second, and the looting criterion can be satisfied when the performance indicator exceeds some fixed value, such as 10,000. In some instances, the looting criterion may be met when a performance indicator falls below a given threshold. For instance, a performance indicator relating to free disk space may fall precipitously if a looting activity includes writing to disk. In these cases, the looting criterion can be met when the performance indicator representing free disk space falls below a predetermined threshold, such as 1 GB.

In certain cases, where the set of performance indicators includes greater than one performance indicator, the performance indicators are combined to produce an overall performance indicator. The performance indicators may be combined in a wide variety of ways. In one example, the performance indicators are simply added together. In another example, different performance indicators are weighted differently and combined to produce a weighted sum. In yet another example, performance indicators are multiplied together or divided. In other examples, performance indicators are combined using fuzzy logic, combinatorial logic, Beyesian filtering, neural networks, or sequences of conditional statements. In some examples, sequences of events are considered, such as a first performance indicator changing followed by a second performance indicator changing. There are indeed a myriad of ways of combining performance indicators, all of which are intended to fall within the scope of the high level concepts disclosed herein.

In this regard, it is also understood that time information may be considered along with performance indicators. For instance, a performance indicator briefly exceeding a threshold may not itself indicate a threat, but the same performance indicator remaining above the threshold for a period of time may indeed suggest looting. The extent of looting may be proportional to the product of the performance indicator's magnitude and the amount of time the performance indicator remains elevated. In these scenarios, the looting criterion can be established so that it is satisfied when the performance indicator remains above a predetermined threshold for a predetermined period of time. Using the database example previously given, the looting criterion may instead be defined so that it is satisfied only when the number of database queries exceeds 10,000 within a specified timeframe, such as one minute. In normal application, the LRU 130 typically obtains time information from the OS 122 and can apply this time information in determining whether the looting criterion is met.

Time information may be used in other ways. For example, a malicious user may conduct looting activity in distinct and repeated bursts, where each burst is relatively short. Because the bursts are repeated, however, a large amount of data is eventually obtained. The looting criterion can be tuned to respond to this type of threat by maintaining a running average of performance indicators as a function of time, or otherwise processing them as a function of time, thereby identifying threats that would otherwise go undetected.

As indicated, the looting criterion can be established by an administrator or other privileged user of the computing system 100 or by the LRU 130 itself. Proper setting of the looting criterion generally involves a balance between avoiding false-positives (indications of looting where none is present) and avoiding false negatives (failing to detect looting when it is happening). False positives and negatives can generally be avoided through the application of expert knowledge of the computing system's responses to threats.

The requisite expert knowledge can be acquired by a human user or by the LRU 130 itself. In one example, the LRU 130 is made to monitor a wide range of performance indicators produced by the computing system 100. The LRU 130 stores data pertaining to the states of the performance indicators over time and thereby establishes a baseline of normal behavior. To enhance the LRU's training, privileged users of the computing system 100 may simulate looting activity, i.e., attempt safely to loot sensitive data just as a malicious user might, while the LRU 130 continues to monitor the performance indicators. The LRU 130 then identifies performance indicators that change substantially when simulated looting occurs. The LRU 130 can then include the performance indicators that change substantially in the set of performance indicators it uses to monitor for actual looting threats. It may exclude other performance indicators from the set of performance indicators. In another example, a set of performance indicators is already established. During simulated looting, the LRU 130 monitors the performance indicators for changes. Performance indicators that change substantially are included in the looting criterion whereas those that do not change substantially are excluded. Also, the looting criterion can be adjusted based on the manner in which the performance indicators change. In any case, the looting criterion may be generated or adjusted automatically by the LRU 130 in response to observed behavior.

Also, although not specifically shown, the LRU 130 preferably includes an "off" setting. The off setting turns off all remedial measures and allows the computing system 100 to operate without looting protection. This setting may be useful in circumstances in which authorized users wish to perform certain safe operations which are expected to meet the looting criterion (or criteria) in effect, but for which remedial measures are not desired.

Figure 4:
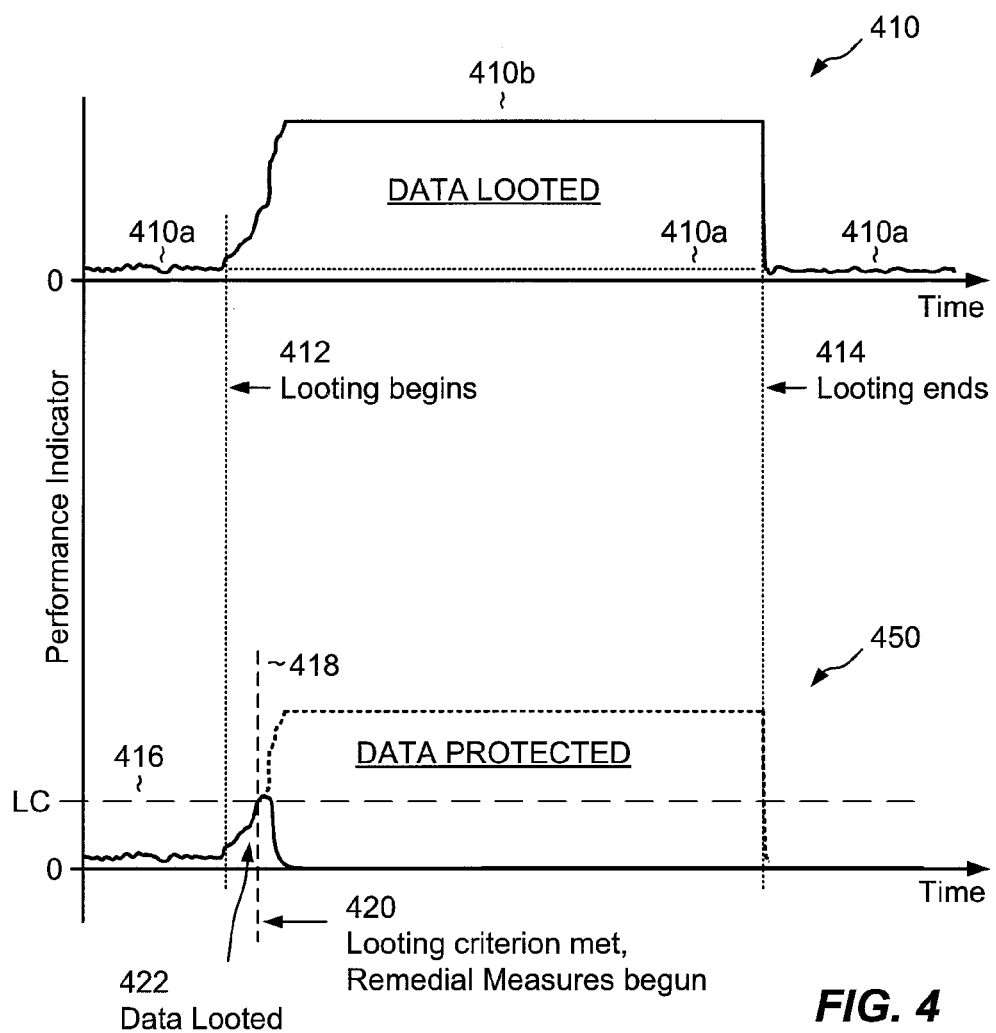
FIG. 4 is a graph showing variations in an example of a performance indicator versus time both before and after looting detection and remediation.

FIG. 4 shows an example of looting activity before and after looting detection and remediation. It is assumed in this example that any other security measures used in the computing system 100 have failed. For example, a hacker may have gained access using stolen credentials and successfully bypassed any firewall and anti-virus program.

The top curve 410 represents a case without looting detection and remediation, and the bottom curve 450 represents a case after looting detection and remediation as described herein have been implemented. The set of performance indicators in this example is a single performance indicator, and the looting criterion (LC) is simply a threshold 416.

From the curve 410 (without protection) it is seen that the performance indicator varies around a baseline value 410a. However, at time 412, looting begins, and the performance indicator begins to rise. Eventually, the performance indicator may hit a limit 410b, such as one imposed by hardware, and the performance indicator may remain at that limit until all of the sensitive data has been obtained. Sometime later, at time 414, looting is complete and the performance indicator returns to its normal baseline level 410a. In this example, all sensitive data has been looted. The amount of data looted is roughly proportional to the area under the curve 410 above the baseline 410a.

In contrast, the curve 450 shows the identical scenario with protection. As before, any other defenses of the computing system 100 may be assumed to have failed, and looting begins at time 412. The performance indicator begins to increase and eventually exceeds a threshold 416 at a time 420. Upon exceeding the threshold, the looting criterion is satisfied, and remedial measures are executed. As described, the remedial measures stop the looting in progress and may take other measures to ameliorate its effects. As the remedial measures are commenced, the looting ends and the performance indicator drops essentially to zero. The amount of sensitive data successfully looted is thus represented by the area under the small pulse 422. The large area under the dotted portion of the curve 450 represents the amount of sensitive data protected.

Although looting has not been completely avoided, its worst effects have been averted. Rather than a malicious user obtaining all the sensitive data in the data store 118, the user obtains only a small fraction of the total amount stored.

Although any loss of data is regrettable, limiting the amount of data lost significantly limits the harm both to legitimate users of the computing system 100 and to the facility that houses the sensitive data.

It should be understood that the particular looting profile or signature shown in FIG. 4 is by way of example only and that activities which are indicators of looting activity may result in other graphs and curves/shapes. Such measurable patterns may include spikes, periodic waves, extreme drops in value, and so on.

Data protection laws have become increasingly strict. Recently approved regulations impose large fines on data storage facilities for the loss of sensitive information. In some cases, the fines prescribed are in direct proportion to the amount of data lost. Through the use of looting detection and remediation as described herein, and in addition to other benefits, data storage facilities stand to benefit from the avoidance of large penalties to which they might otherwise be subjected.

Without limiting the generality of the foregoing, the following specific examples of looting detection and remediation are presented.

A first example is directed to a scenario in which a malicious user attempts to install a program on a computing system (i.e., the computing system 100) for obtaining password hashes. As is known, password hashes are encoded versions of passwords. On systems running the Windows™ operating system, password hashes are typically obtained using a program called PWDUMP.exe. PWDUMP works by repeatedly accessing the Windows Active Directory (AD) from a Windows domain controller (DC). Each AD request delivers a password hash, and AD requests may be repeated until all password hashes are obtained. PWDUMP, acting either alone or in connection with other programs, may compress the password hashes and move them off of the computing system. The malicious user may then try to "crack" the password hashes offline to obtain actual system passwords. The passwords may then be used later to log onto the computing system to access the personal data of the users whose passwords have been obtained. At least initially, the sensitive information is the password hashes, although later it may be the data stored behind the passwords.

Although PWDUMP may normally be recognized by antivirus software running on the computing system 100, malicious users may rename the program and change its contents slightly so that it is no longer easily detectable. Defenses generally relied upon may thus fail to protect against the threat.

The Windows DC provides a performance indicator that reflects the number of AD requests per second. Where the DC is a computing system 100 having an LRU 130, the LRU 130 may receive this performance indicator and determine whether it meets the looting criterion. Typically, depending on server activity, this performance indicator hovers at a baseline between tens and hundreds of requests per second. However, during looting, the AD requests may jump to tens of thousands of requests per second. The performance indicator may remain elevated for minutes or even hours as thousands of password hashes are obtained. By setting the looting criterion to a threshold above the baseline, such as at 1000 AD requests per second, the LRU 130 may detect this type of looting early, before many records are obtained, and execute remedial measures. These may include sending a looting alert to the CIRT 152, logging off all users (since the identity of the malicious user may be unknown), directing a firewall or switch/router to shut down network traffic, and stopping all processes (except itself, since the identity of the malicious process may be unknown). Although this example is described in connection with the Windows operating system, it also applies to other operating systems. For instance, although Unix may not specifically support domain controllers or active directories, it can support LDAP (Lightweight Directory Access Protocol) and NIS (Network Information Service), which are similar constructs.

A second example relates to a database used by a web application running on a web server. In normal operation, users may access the database by logging onto the web application from their local client machines. Users may view, add, or change their personal data, which may include sensitive information. Most access to the database normally passes through the web application; however, a small amount of access may be made by certain authorized users (such as administrators) through other paths. Malicious users may also be able to access the database through other paths, assuming they can overcome security measures. By design, the web application may support only a certain maximum number of queries per second to the database. The database itself is configured to generate a performance indicator that designates the number of queries per second that it receives. Here, the looting criteria may be set to a value of the performance indicator near or slightly above the maximum number of queries per second supported by the web application. If the performance indicator exceeds that value, the looting criterion is met and remedial measures are taken. These typically include shutting down the database, shutting down a segment of the firewall, and notifying the CIRT.

A third example is directed to a file server. The file server may be a computer on a corporate intranet which stores documents and/or other sensitive files pertaining to the operation of the corporation. An LRU 130 installed on a file server can monitor a performance indicator relating to data access such as a rate or number of disk I/O's, file requests, and so on. Over time and through acquired experience, the LPR 130 may learn baseline behavior of this performance indicator. A looting criterion can be set above this normal baseline. In this instance, however, it is not unusual for legitimate users to occasionally make copies of large directories. To filter out this condition, the looting criterion includes a time component as well as a magnitude component. Therefore, suspected looting is detected only when the data access performance indicator exceeds a predetermined threshold and remains above the threshold for a predetermined period of time. When this occurs, various remedial measures may be executed, including restricting file access, logging out users, and notifying the CIRT 152.

Techniques have been disclosed herein for detecting looting of sensitive information and remediating its effects. These techniques help to prevent harm to both users and the facilities that house the sensitive information. It is understood that various aspects of the present invention may be used alone, in combination, or in a variety of arrangements not specifically set forth in the foregoing. For example, aspects described in one embodiment may be combined in any manner with aspects described in other embodiments. The various methods or processes outlined herein may be encoded as software. The software may be written using any of a number of suitable programming languages and/or programming or scripting tools.

Also, the invention or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like. Multiple computer-readable media may be used. The medium (or media) may be encoded with instructions which, when executed on one or more computers or other processors, perform methods that implement the various embodiments of the invention described herein. Such medium (or media) may be considered an article of manufacture or a machine, and may be transportable from one machine to another.

While various embodiments of the invention have been particularly shown and described, it will be understood by those skilled in the art that various changes in form and details may be made therein.

Figure 5:
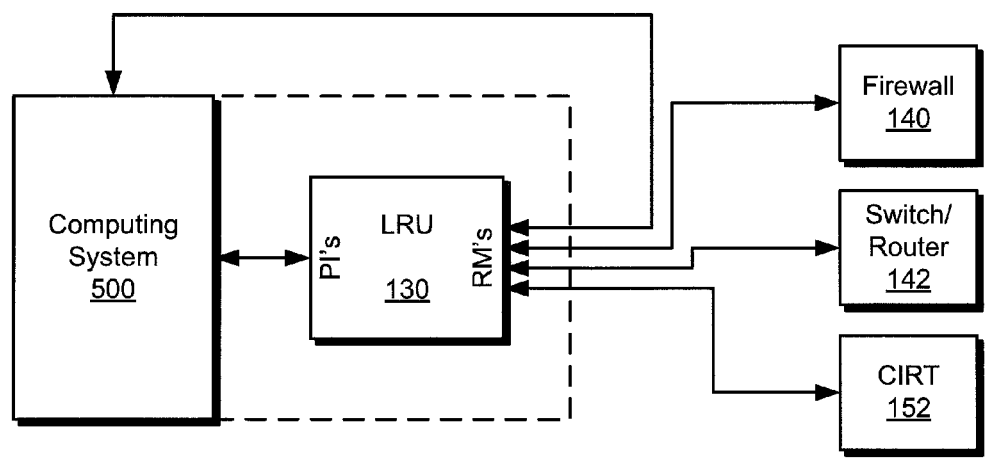
FIG. 5 is a block diagram showing a more general arrangement for looting detection and remediation.

For example, the LRU 130 is disclosed herein as computer software that runs on the computing system 100. However, this is merely an example. FIG. 5 shows a more general realization of the LRU 130. Here, the LRU 130 may be included within the computing system 100 or provided externally. In one example, the LRU 130 is implemented as a hardware device. The hardware device includes one or more circuit boards, processors, memories, ASIC's, and/or FPGA's. The hardware device connects to a bus of the computing system 500 or to a communication port, such as Universal Serial Bus (USB), firewire, Bluetooth, Ethernet, WiFi, or another type of port. The memory/memories store instructions for performing the various functions of the LRU 130, such as those shown in FIG. 3, and the processor(s) execute those instructions.

As shown and described, performance indicators have been disclosed herein as originating from computer software, such as the OS 122 and/or software 126a-n. However, performance indicators may also originate in hardware, such as from sensors, connected to devices of the computing system 100. In one example, a temperature sensor is attached to a device, such as a processor or memory, for measuring its temperature, in instances where a high temperature reading suggests malicious activity. The sensor may be connected to a device, which has a device driver that communicates with the LRU 130 using the LRU's software interface. Where the LRU 130 is implemented in hardware, or in a combination of hardware and software, the output of the sensor may in some instances be wired directly to the LRU 130, which may internally convert its results to digital format.

Also, as shown and described, the data store 118 housing the sensitive information resides on the same computing system 100 that includes the LRU 130. Alternatively, the data store may reside on a separate computing system, with the computing system 100 acting as an upstream device. The computing system 100 may thus collect and monitor performance indicators from the computer housing the sensitive information and execute remedial measures to protect the sensitive data when the looting criteria are met.

In addition, although looting detection has been disclosed in conjunction with looting remediation, both are not strictly required. For example, looting detection alone may be performed, without looting remediation.

Also, although remedial measures described herein include stopping processes or other software being run on the computing system 100, the remedial measures may alternatively operate to slow them down. Slowing down processes limits the extent of their damage and gives an opportunity for other security measures, such as anti-virus software, to operate. Slowing down processes also keeps the computing system 100 working for the benefit of its legitimate users. A process may be slowed down by a number of means, including depriving the process of memory or running other processes that compete with the suspect process for resources. According to one variant, the LRU 130 may slow down suspect processes even before the looting criterion is met, as the respective set of performance indicators approach the looting criterion. Thus, a sliding scale for implementing remedial measures may be applied.

As shown and described, the computing system 100 is a physical system, such as a rack-mounted server or desktop computer. However, it is understood that the computing system 100 can be any type of computer or computing device. It may be composed of multiple computing devices operating together. The computing devices may be physical machines or virtual machines.

Also, although looting detection and remediation are described in examples in which the computing system 100 serves a large number of users, this is not required. Looting detection and remediation may be used in machines serving any number of users, including a single user, and on any type of machine, including, for example, desktop computers, laptop computers, tablet computers, smart phones, PDA's, and the like. Indeed, household users may install a software product embodying looting detection and remediation on their computing devices, just as they would install anti-virus software. The techniques disclosed herein are not limited to any type of environment.

In addition, the computing system 100 may be one of many computing systems, such as may be found at a server farm or other facility. In this type of environment, remedial measures may include directly alerting peer computers of any detected looting so they may operate at a heightened level of security. Where sensitive information is distributed across multiple computing systems, the LRU 130 may be configured to gather performance indicators across the different computing systems. The looting criterion may be established for the resulting group of computing systems, and remedial measures may be executed to protect all computing systems in the group.

Furthermore, it should be understood that the above-described forms of sensitive information and remedial measures were offered by way of example only. Other forms of sensitive information and remedial measures are suitable for use as well. Along these lines, the above-described techniques are capable of modifying/controlling access to any object, component or portion of a computing system. Items/objects to which access may be modified include databases, files, directories, folders, data structures, tables, records, components, peripherals, services, privileges, and operations among other things. Those skilled in the art will therefore understand that various changes in form and detail may be made to the embodiments disclosed herein without departing from the spirit and scope of the invention as defined by the appended claims.

What is claimed is:

1. A method of limiting the amount of sensitive information looted during a malicious attack on a computing system, comprising:
   monitoring a set of performance indicators of the computing system, the set of performance indicators providing a measure of sensitive information being accessed on the computing system;
   testing whether the monitored set of performance indicators indicates a likelihood of looting; and
   temporarily reducing access to the sensitive information on the computing system in response to the act of testing indicating a likelihood of looting,
   wherein the method further comprises establishing a looting criterion pertaining to the set of performance indicators that indicates a likelihood that the sensitive information is being looted,
   wherein the act of testing comprises determining whether the looting criterion is satisfied, wherein the looting criterion is based at least in part on an amount of time that a performance indicator remains at a particular level, wherein monitoring the set of performance indicators includes monitoring a number of directory requests per second from a domain controller, wherein testing whether the monitored set of performance indicators indicates a likelihood of looting includes testing whether the number of directory requests per second from the domain controller exceeds 1000, and wherein testing whether the number of directory requests per second from the domain controller exceeds 1000 is performed after a malicious user has renamed a PWDUMP.exe program in the computerized system and changed its contents to avoid detection by anti-virus software.

2. The method of claim 1, further comprising determining an overall performance indicator from the set of performance indicators, wherein the act of establishing the looting criterion comprises setting a threshold of the overall performance indicator, and wherein the act of determining whether the looting criterion is satisfied comprises comparing the overall performance indicator to the threshold.

3. The method of claim 1, wherein the looting criterion is based at least in part on a predetermined sequence of events among the members of the set of performance indicators.

4. The method of claim 1, wherein the looting criterion is based at least in part on a sequence of conditional statements pertaining to the set of performance indicators.

5. The method of claim 1, wherein the act of temporarily reducing access to the sensitive information comprises directing an upstream firewall to disable network communication with the computing system.

6. The method of claim 5, wherein the step of temporarily reducing access to the sensitive information further comprises directing an upstream network switch to disable network communication with the computing system.

7. The method of claim 1, wherein the step of temporarily reducing access comprises at least one of:
logging out at least one user of the computing system;
stopping at least one process or other software running on the computing system; or
modifying access to at least one object of the computing system.

8. The method of claim 1, wherein monitoring the set of performance indicators includes monitoring performance indicators pertaining to at least one of disk access and network traffic.

9. The method of claim 1, wherein the looting criterion received as input from the human user includes an automatically generated looting criterion that was modified by the human user.

10. The method of claim 1, wherein monitoring the set of performance indicators includes an operating system of the computing system monitoring its own performance indicators and providing the performance indicators only when the performance indicators show abnormal activity.

11. A computer-implemented system for limiting the amount of sensitive information looted during a malicious attack on a computing system, comprising:
a memory for storing software instructions; and
a processor coupled to the memory for running the software instructions, wherein the processor is configured to— monitor a set of performance indicators of the computing system, the set of performance indicators providing a measure of sensitive information being accessed on the computing system;
test whether the monitored set of performance indicators indicates a likelihood of looting; and
temporarily reduce access to the sensitive information on the computing system in response to the act of testing indicating a likelihood of looting;

wherein the processor is further configured to establish a looting criterion pertaining to the set of performance indicators that indicates a likelihood that the sensitive information is being looted, wherein, when configured to test whether the monitored set of performance indicators indicates a likelihood of looting, the processor is further configured to determine whether the looting criterion is satisfied, and wherein the looting criterion is based at least in part on an amount of time that a performance indicator remains at a particular level, wherein, when configured to monitor the set of performance indicators, the processor is further configured to monitor a number of directory requests per second from a domain controller, wherein, when configured to test whether the monitored set of performance indicators indicates a likelihood of looting, the processor is further configured to test whether the number of directory requests per second from the domain controller exceeds 1000, and wherein, when configured to test whether the number of directory requests per second from the domain controller exceeds 1000, the processor is further configured to perform the test after a malicious user has renamed a PWDUMP.exe program in the computerized system and changed its contents to avoid detection by anti-virus software.

12. The system of claim 11, wherein the software instructions comprise a software communication interface.

13. The system of claim 12, wherein the software communication interface is constructed and arranged for communicating with a first set of items for receiving therefrom the set of performance indicators.

14. The system of claim 13, wherein the software interface is constructed and arranged for communicating with a second set of items for reducing access to the sensitive information.

15. The system of claim 14, wherein said second set of items includes any of an operating system, application program, process, daemon, service, switch/router, or firewall.

16. A non-transitory computer readable media including instructions which when executed by a processor cause the processor to perform a method of limiting the amount of sensitive information looted during a malicious attack on a computing system, the method comprising:
monitoring a set of performance indicators of the computing system, the set of performance indicators providing a measure of sensitive information being accessed on the computing system;
testing whether the monitored set of performance indicators indicates a likelihood of looting; and
temporarily reducing access to the sensitive information on the computing system in response to the act of testing indicating a likelihood of looting,
wherein the method further comprises establishing a looting criterion pertaining to the set of performance indicators that indicates a likelihood that the sensitive information is being looted, wherein the act of testing comprises determining whether the looting criterion is satisfied, and wherein the looting criterion is based at least in part on an amount of time that a performance indicator remains at a particular level, wherein monitoring the set of performance indicators includes monitoring a number of directory requests per second from a domain controller, wherein testing whether the monitored set of performance indicators indicates a likelihood of looting includes testing whether the number of directory requests per second from the domain controller exceeds 1000, and wherein testing whether the number of directory requests per second from the domain controller exceeds 1000 is performed after a malicious user has renamed a PWDUMP.exe program in the computerized system and changed its contents to avoid detection by anti-virus software.

17. The non-transitory computer readable media of claim 16, wherein the step of temporarily reducing access comprises at least one of:

disabling at least one upstream network device;

logging out at least one user of the computing system;

stopping at least one process running on the computing system; or modifying access to at least one object of the computing system.

* * * * *